United States Patent
Buckley et al.

(10) Patent No.: US 6,907,946 B1
(45) Date of Patent: Jun. 21, 2005

(54) BRAKE SYSTEM FOR A TRACKED VEHICLE

(75) Inventors: Shawn D. Buckley, Simi Valley, CA (US); Kenneth C. Ramey, Thousand Oaks, CA (US); William H. Wood, Camarillo, CA (US)

(73) Assignee: Wilwood Engineering, Camarillo, CA (US)

( * ) Notice: Subject to any disclaimer, the term of this patent is extended or adjusted under 35 U.S.C. 154(b) by 0 days.

(21) Appl. No.: 10/706,388

(22) Filed: Nov. 11, 2003

(51) Int. Cl.[7] ............................................. B62D 55/08
(52) U.S. Cl. ...................... 180/9.21; 180/9.44; 188/38; 188/18 R
(58) Field of Search ............................. 180/9.21, 9.44, 180/9.1, 9.38, 9.42; 188/38, 18 R, 21, 22, 188/284

(56) References Cited

U.S. PATENT DOCUMENTS

| | | | | |
|---|---|---|---|---|
| 4,467,900 A | * | 8/1984 | Shore et al. | 192/13 R |
| 4,538,641 A | * | 9/1985 | Chatterjea | 137/596.1 |
| 4,691,809 A | * | 9/1987 | Le Marchand et al. | 188/71.9 |
| 4,893,525 A | * | 1/1990 | Gabor | 475/241 |
| 2004/0159510 A1 | * | 8/2004 | Bergman et al. | 188/218 XL |
| 2005/0000759 A1 | * | 1/2005 | Kingston et al. | 188/71.5 |

* cited by examiner

Primary Examiner—Avraham Lerner
(74) Attorney, Agent, or Firm—Kenneth J. Hovet; Paul D. Chancellor

(57) ABSTRACT

A direct braking of a drive shaft for a tracked vehicle that moves on rotating track(s). A disc brake is connected to the same drive shaft that has sprocket(s) for engaging the track(s). Upon activation by a vehicle driver, opposing pistons engage the disc to retard rotation of the drive shaft. This, in turn, causes slower rotation of the tracks and slower movement of the vehicle.

10 Claims, 4 Drawing Sheets

BRAKE SYSTEM FOR A TRACKED VEHICLE

BACKGROUND OF THE INVENTION

1. Field of the Invention

The present invention relates to hydraulically actuated disc brake systems. More particularly, it relates to brake systems for use on tracked vehicles.

2. Description of Related Art

Tracked vehicles have historically relied on indirect braking systems frequently designed to utilize convex or concave friction braking pads pressed against an inner or outer perimeter of a circular brake drum. Since these tracked vehicles tended to be large and slow, their braking systems were often adapted to operate indirectly, such as on lower torque shafting near the prime mover, rather than directly on the higher torque shafting driving the track. Locating track braking systems near the prime mover also removed brake components from the harsh track operating environment.

Newer tracked vehicles include small, lightweight machines that operate at high speeds. These modern tracked vehicles require a lightweight braking solution that operates reliably at high speeds. Suggested by their widespread use on automobiles, disc brakes have been adapted to some modern tracked vehicles. However, these adaptations have lower performance and reliability than state-of-the-art systems typical of modern automobiles. This is because they do not integrate a reliable and cost effective brake system directly on the track drive shaft.

Problems associated with brake system design for modern tracked vehicles include providing adequate structure for rigidly mounting the system, space for locating the system, and heat transfer for cooling the system. What is needed is a disc brake system design that solves these problems while remaining economical, lightweight, and reliable.

SUMMARY OF THE INVENTION

The present invention provides a disc braking apparatus for braking a vehicular track. A rotatable track has a means for engagement with a driver that imparts rotary motion to the track. A typical driver comprises one or more sprockets directly connected to a shaft. The sprockets directly engage the track. The shaft shares a common axis of rotation with the track and is coupled to a rotary prime mover. Shaft braking is provided by a brake disc directly connected to the shaft. A braking assembly incorporates brake actuator pistons for braking the brake disc and anti-friction bearings for supporting the track drive shaft. The assembly may be cooled by convective cooling fins, by liquid cooling, or by other suitable cooling means. A partition supporting the assembly also serves to isolate the brake disc from the track environment.

BRIEF DESCRIPTION OF THE DRAWINGS

The present invention is described with reference to the accompanying figures. In the figures, like reference numbers indicate identical or functionally similar elements. Additionally, the left-most digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

DESCRIPTION OF THE PREFERRED EMBODIMENTS

Introduction:

The present invention provides a disc braking system for tracked vehicles. A braking assembly incorporates pistons for applying braking forces and bearings to support a shaft rotating with the brake disc. The integral structure utilizes the stiffness of the shaft to resist yaw between the brake disc and the braking assembly.

Braking systems according to the present invention feature shorter piston travel since clearances between the piston and disc are reduced. Formerly, large clearances in the range of 0.05 to 0.15 inches were maintained to accommodate unwanted relative motion between the braking assembly and the disc. The large clearance assured that flexing during operation would not cause disc collisions that knock the piston(s) back into the piston bore(s). Increasing the structural rigidity of the system reduces unwanted relative motion and, therefore, reduces required clearances between the piston(s) and the brake disc. Reduced clearances also reduce piston travel during braking and thereby improve brake responsiveness, reliability, and safety.

Braking systems according to the present invention also feature enhanced convective cooling from the brake disc and the braking assembly. Enhanced cooling reduces the heat transfer area required and, consequently, the physical size of these parts. Smaller parts allow for more compact brake system assemblies and facilitate mounting the brake disc directly on the track drive shaft. Direct braking of the track drive shaft eliminates the need for an intermediate shaft and the loss of reliability associated with a belt, chain, or similar drive between an intermediate shaft and the track drive shaft.

Figure 1:
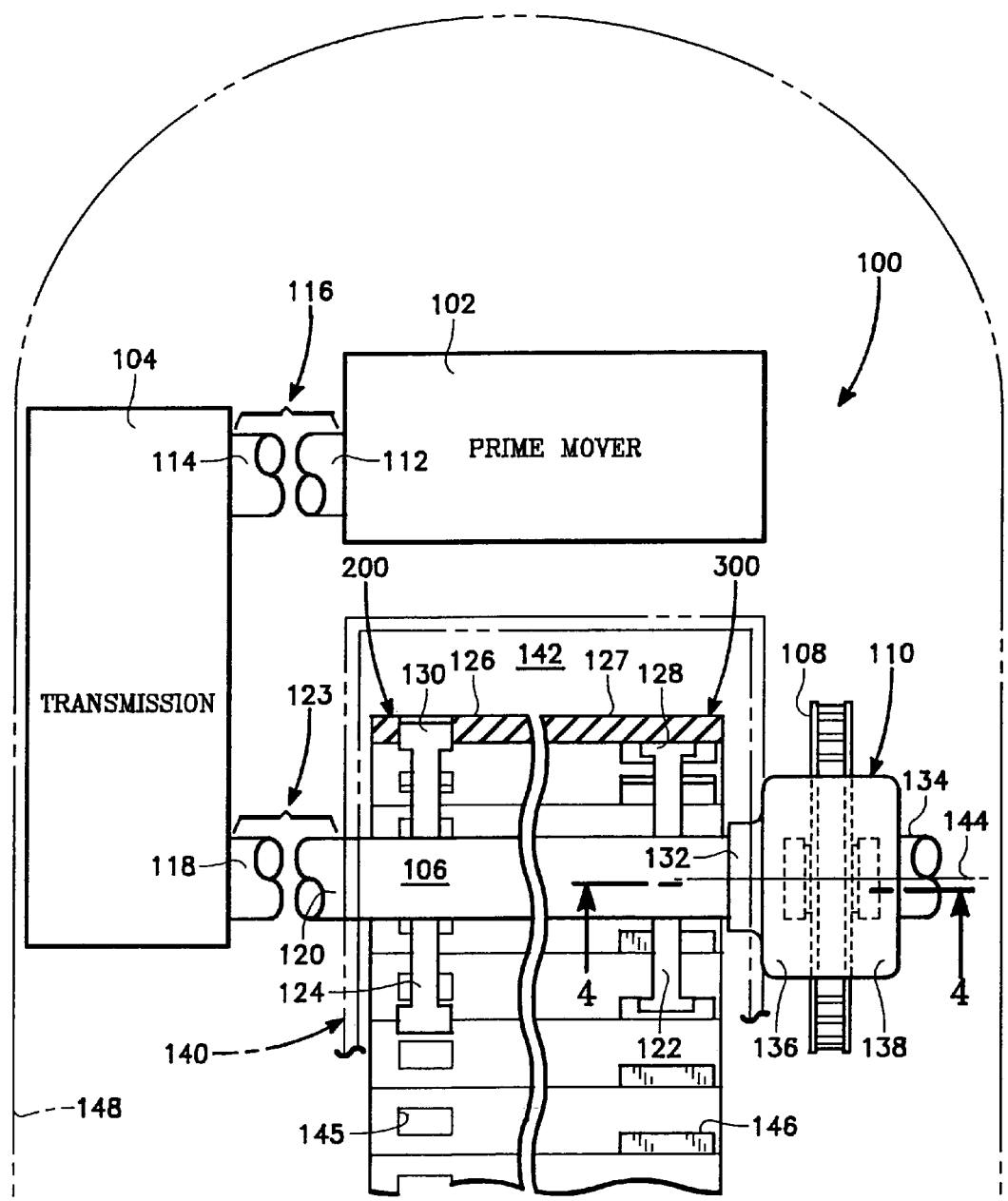
FIG. 1 is a schematic view of a tracked vehicle power train incorporating the braking system of the present invention.

Brake System:

FIG. 1 shows a tracked vehicle power train 100. The basic elements of the power train include a rotary prime mover 102, a transmission 104, a track drive shaft 106, a brake disc 108, and a braking assembly 110. The track drive shaft is, therefore, indirectly driven by the prime mover, and directly braked by the brake disc.

Prime mover output shaft 112 connects to an input shaft 114 of transmission 104 by a transmission input coupling depicted schematically by reference 116. Transmission output shaft 118 is connected to the track drive shaft drive end 120 by a transmission output coupling depicted schematically by reference 123. Track drive shaft 106, having centerline 144, is directly connected to one or more track drive sprockets. The sprocket(s) may be of the tooth insertion type 124 or they may be the tooth abutting type 122. In either case, one or more sprockets of either type may be employed.

Figure 2:
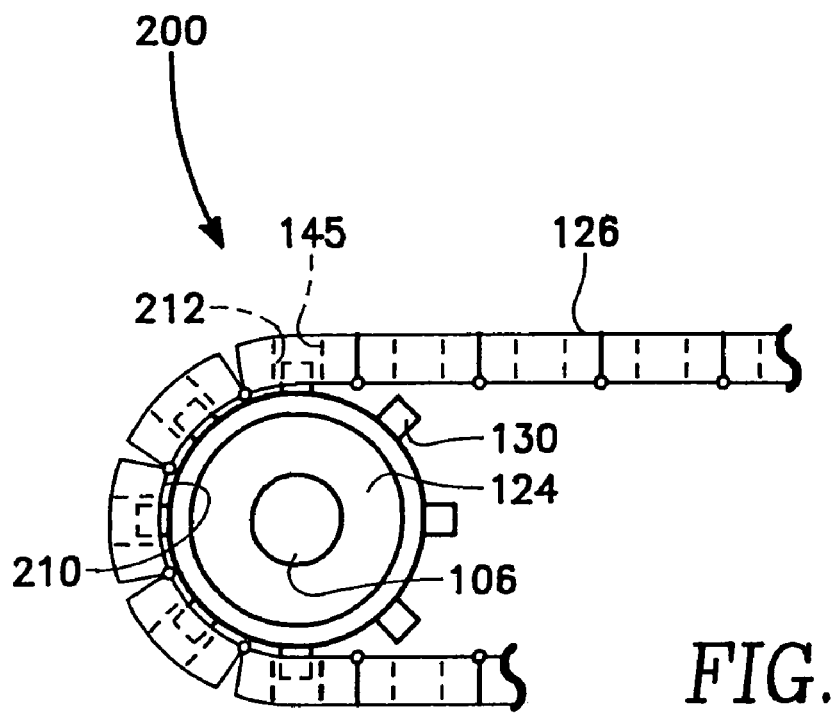
FIG. 2 is a fragmentary side view of a first track drive connection of FIG. 1.

Reference is now made to FIG. 1 showing a first track type 126 and also to FIG. 2 where a portion of a first track drive connection is shown generally by reference 200. First track drive shaft sprocket(s) 124 have first teeth 130 that engage track openings 145 in the undersurface 210 of the rotatable first track 126. The insertion contact points 212 between the first teeth and the walls of the track openings enables forces to be exchanged between the first track and the first teeth.

Figure 3:
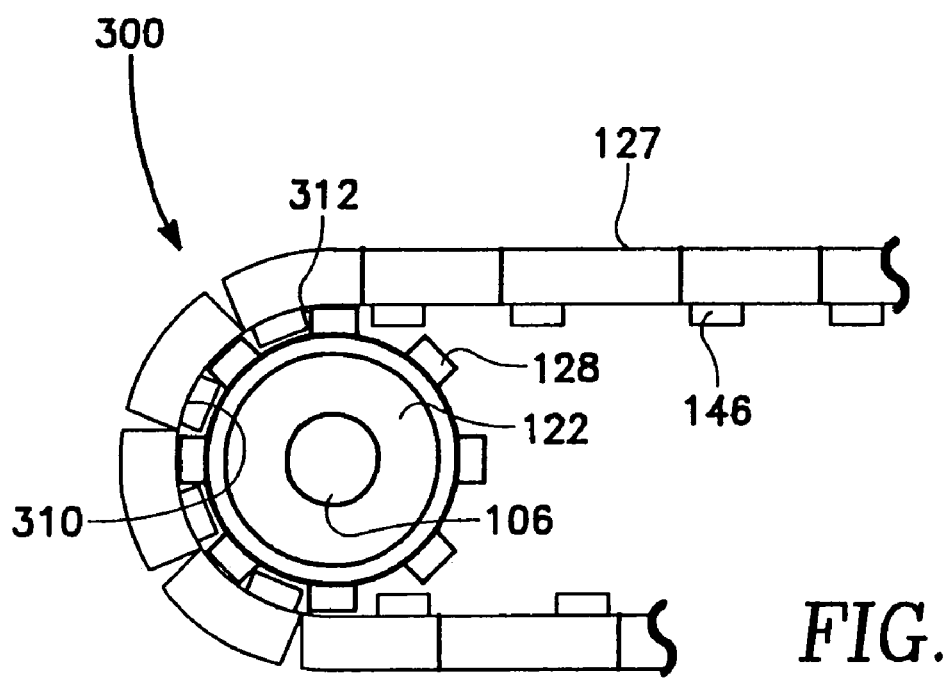
FIG. 3 is a fragmentary side view of a second track drive connection of FIG. 1.

Reference is now made to FIG. 1 showing a second track type 127 and also to FIG. 3, where a portion of a second track drive connection is shown generally by reference 300. Second track drive shaft sprocket(s) 122 have second teeth 128 that engage track projections 146 on the undersurface 310 of rotatable second track 127. The abutting contact points 312 between the second teeth and adjacent projections on the second track enables forces to be exchanged between the second track and the second teeth.

Referring again to FIG. 1, a bearing housing 132 provides rotary support to drive shaft 106 near its free end 134. The bearing housing, a first cylinder body portion 136, and a second cylinder body portion 138 form a braking assembly 110. Brake disc 108 is mounted directly to drive shaft 106 such that cylinder body portions 136 and 138 straddle the brake disc periphery. Track partition 140 or another similar structure supports the braking assembly 110 and may also isolate the brake disc 108 from the track environment 142. Vehicle structure also includes body part 148 having interconnections (not shown) with the track partition.

Referring to FIGS. 1–3, forces may be transmitted between the track drive shaft 106 and the track 126, 127 as described, or other similar methods may be used. A similar method may transmit force to the track using contact friction between a friction element directly connected to track drive shaft 106 and a feature or surface on the track adapted to a friction drive (not shown).

Figure 4:
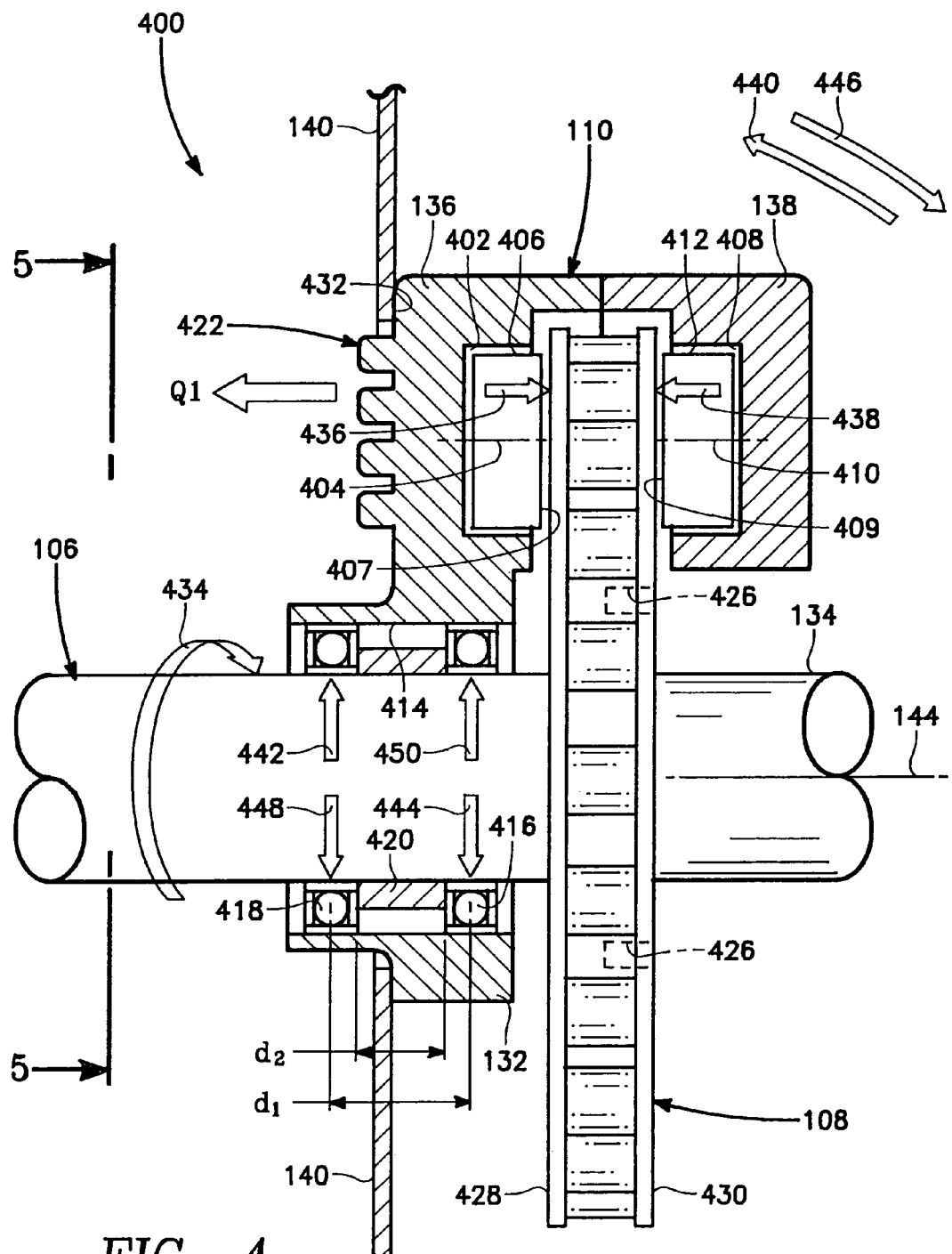
FIG. 4 is an enlarged cross-sectional view taken along lines 4—4 of FIG. 1.

Referring now to FIG. 4, the braking system of FIG. 1 is shown by reference 400 in more detail. The first cylinder body portion 136 has a blind first piston bore 402 with a centerline 404. A first piston 406 is slidably engaged in the first bore 402. Similarly, the second cylinder body portion 138 has a blind second piston bore 408 with a centerline 410. A second piston 412 is slidably engaged in the second bore 408. The first cylinder body portion 136 is oriented with respect to the second cylinder body portion 138 such that the respective free ends 407, 409 of the pistons 406, 412 are opposed and spaced-apart with a radial outer portion of the brake disc 108 interposed between them.

The first and second body portions 136, 138 and the bearing housing 132 may be separate parts held together by fasteners, by welding, or by other suitable means. Alternatively a single casting, forging, or machined piece may form one or more of these parts into a single unit.

As one who is skilled in the art will recognize, the opposed cylinder body and piston arrangement discussed above may be replaced with a floating cylinder body design. This alternative floating cylinder body design employs a single cylinder body and piston opposed by a fixed anvil (not shown). Here, an outer radial portion of disc 108 is interposed between the piston free end and a surface of the anvil.

Still referring to FIG. 4, bearing housing 132 has a bearing bore 414. One or more bearings are inserted in the bearing bore 414. A first bearing 416 and a second bearing 418 are shown inserted in the bearing bore. The bearings provide rotatable support for the track drive shaft 106. The bearings may be anti-friction bearings. A spacer 420 may be used to provide an effective spacing between the bearings thereby creating a significant moment arm to restrain yaw of the track drive shaft relative to the braking assembly 110.

Figure 5:
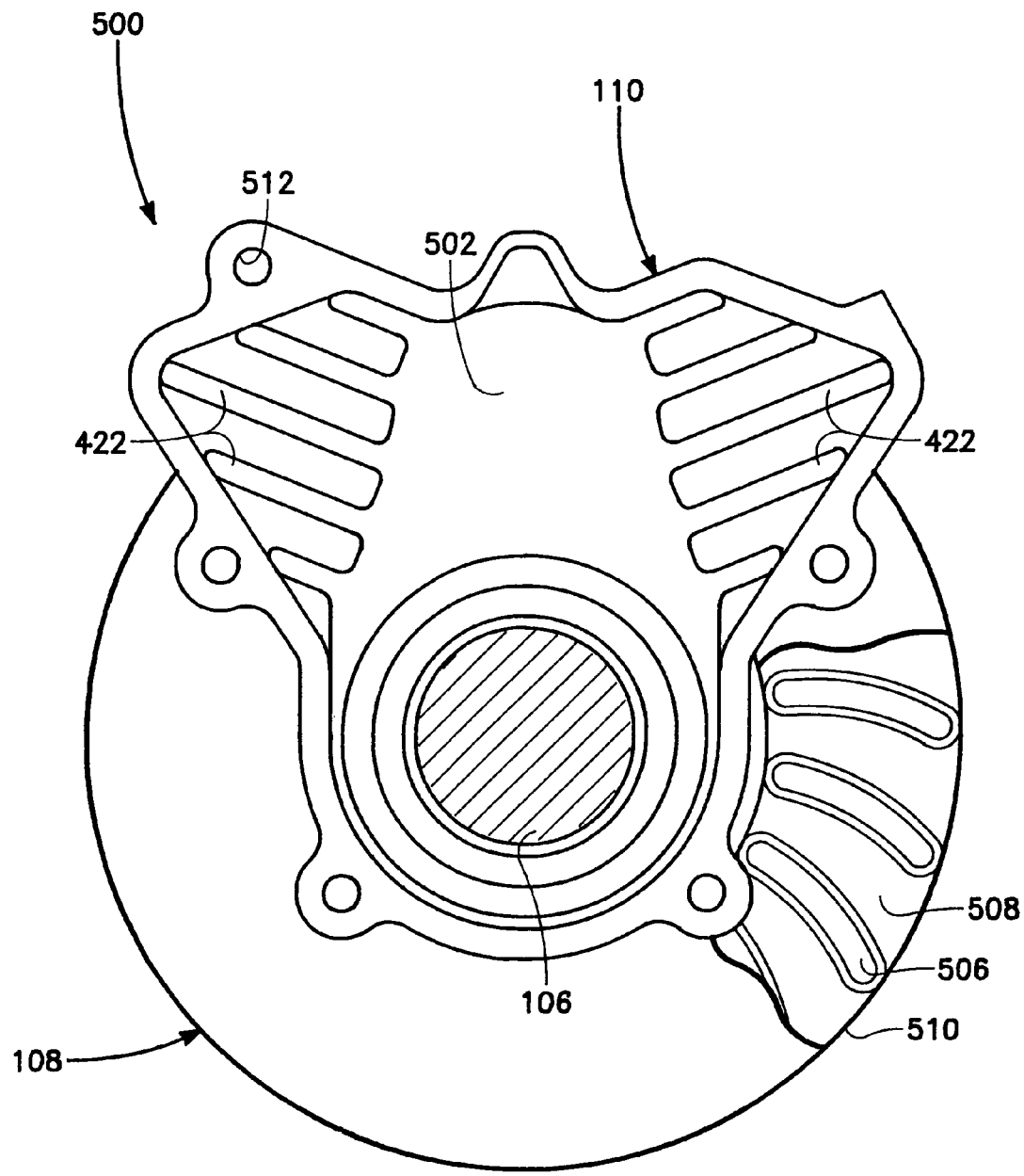
FIG. 5 is a left end view taken along lines 5—5 of FIG. 4.

Referring now to FIG. 5, a left end view 500 of the braking system of FIG. 4 is shown. The left end face 502 of the braking assembly 110 has optional convective cooling fins 422. The braking assembly 110 may be mounted within a bearing assembly cut-out 432 of the track partition(s) 140. This arrangement exposes the convective cooling fins to the environment 142 where the track 126, 127 operates.

As one who is skilled in the art will recognize, the cooling fins described above may be replaced by other known cooling means. Alternatives include, for example, liquid cooling means wherein the braking assembly 110 incorporates passages for circulating a liquid coolant (not shown).

Referring to a cut-away portion of FIG. 5, the brake disc 108 has a plurality of interior airfoils 506 defining generally radial channels 508 between a first disc plate 428 and a corresponding second disc plate 430. The radial channels may extend from an annular inlet groove 426 in the second disc plate 430 to the peripheral exhausts 510. Mounting tabs 512 may be located around the perimeter of the braking assembly face 502. The tabs provide a means for fastening the assembly to the partition(s) 140 or to similar support structures.

Operation:

In FIG. 4, operation of the brake system 400 tends to retard the track drive shaft 106 rotation when the first and second pistons 406, 412 press respective friction pads (not shown) against opposing sides of the rotating disc 108. Rubbing the friction pads on the rotating disc converts the kinetic energy of rotation to frictional heating. Both the disc and the brake assembly 110 become heated thereby during the braking process.

Still referring to FIG. 4, heat generated by braking increases the temperature of the bearing assembly 110. Convective heat transfer Q1 from the cooling fins 422 is enhanced when the surrounding air is stirred by the rotating track and or by vehicle motion. As one who is skilled in the art will recognize, the braking assembly 110 may be cooled by means other than convective cooling fins including coolant circulation as described above.

In FIG. 5, heat generated by braking increases the temperature of the disc 108. To enhance heat transfer from the disc the airfoils 506 induce air flow from a common annular inlet groove 426 through radial passages 508 to peripheral exhaust outlets 510. Relatively cool air flowing through the channels is heated as it cools the hot disc. This ventilated disc design enhances convective heat transfer from the disc, reducing the disc surface area and disc diameter required for a given braking application.

Referring again to FIG. 4, the disc 108 rotates simultaneously with track drive shaft 106 in a clockwise direction, as indicated by shaft rotation arrow 434. When braking forces, shown by arrows 436 and 438, are applied, the overall braking assembly 110 also tends to rotate in the direction of the shaft rotation arrow. This rotation is resisted by the connections between the bearing assembly face 502 and the partition(s) 140. These and other operational forces may cause yaw moments and resulting side-to-side yaw motions indicated by anti-clockwise yaw arrow 440 and clockwise yaw arrow 446. Such yaw motions tend to misalign the normally parallel track drive shift axis 144 and the piston bore centerlines 404, 410. Counter forces developed between the track drive shaft and the bearings 416, 418 resist these yaw moments and restrain yaw motion.

If the yaw moment is anti-clockwise, then the resulting anti-clockwise motion develops resisting first anti-clockwise counter force 442 and second anti-clockwise counter force 444. These forces restrain further anti-clockwise motion. If the yaw moment is clockwise, then the resulting clockwise motion develops resisting first clockwise counter force 448 and second clockwise counter force 450. These forces restrain further clockwise motion. Dimension "d1" between transverse bearing centerlines may be selected by varying the dimension "d2" of spacer 420 to produce moment forces sufficient to resist yaw moments.

Transferring yaw moments 440 and 446 to track drive shaft 106 adds structural rigidity between the disc 108 and the braking assembly 110. This added structural rigidity reduces the allowable un-actuated clearances between the pistons 407, 409 and the brake disc 108, enhancing brake performance while avoiding piston knock back.

Cooling fins 422 located on the braking assembly and exposed to the increased air flow in the track environment 142 enhance convective cooling of the braking assembly. This feature reduces component size while improving life and reliability. Ventilating the brake disc further improves convective cooling of the disc reducing the required disc surface area and diameter while improving life and reliability. By integrating these desirable new features, the current invention provides a compact, high performance disc braking system that is especially well adapted for use on tracked vehicles.

While various embodiments of the present invention have been described above, it should be understood that they have been presented by way of example only, and not limitation. It will be apparent to those skilled in the art that various changes in form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. In a braking assembly coupled to a vehicle for braking a vehicular track said assembly comprising:
    a first body portion having a first piston bore;
    a first piston slidably engaged in said first piston bore and having a first free end;
    a second body portion attached to said first body portion and having a second piston bore;
    a second piston slidably engaged in said second piston bore and having a second free end;
    said first body portion and said second body portion being juxtaposed to locate said first free end opposite from said second free end by a predetermined distance;
    a bearing housing with a bearing bore having one or more bearings inserted; and,
    said bearing housing being attached to one or both of said first and said second body portions such that the centerline of said bearing bore is parallel to the centerlines of each of said piston bores.

2. The apparatus of claim 1 including a shaft rotatably supported by said bearings.

3. The apparatus of claim 2 including a brake disc connected to said shaft wherein a peripheral portion of said disc is interposed between said pistons.

4. The apparatus of claim 3 wherein two bearings are positioned in said bearing bore, said bearing bore including one or more spacers interposed between said two bearings for increasing a moment force resisting yaw between said braking assembly and said shaft.

5. The apparatus of claim 4 wherein said bearings are anti-friction bearings.

6. In a braking assembly coupled to a vehicle for braking a vehicular track said assembly comprising:
    a first body portion having a piston bore;
    a piston slidably engaged in said piston bore and having a free end;
    a second body portion attached to said first body portion and having a surface opposed to said free end and a centerline normal to said surface that passes through a central area of said surface;
    a bearing housing with a bearing bore having one or more bearings inserted; and,
    said bearing housing being attached to one or both of said body portions such that the centerline of said bearing bore is parallel to the centerlines of said piston bore and said surface.

7. The apparatus of claim 6 including a shaft rotatably supported by said bearings.

8. The apparatus of claim 7 including a brake disc connected to said shaft wherein a peripheral portion of said disc is interposed between said pistons.

9. The apparatus of claim 8 wherein a spacer is interposed between said bearings for increasing a moment force resisting yaw between said braking assembly and said shaft.

10. The apparatus of claim 9 wherein said bearings are anti-friction bearings.

* * * * *